United States Patent
Ota et al.

(10) Patent No.: US 10,125,667 B2
(45) Date of Patent: Nov. 13, 2018

(54) STRUCTURE OF COMBUSTION CHAMBER FOR DIRECT INJECTION ENGINE

(71) Applicant: MAZDA MOTOR CORPORATION, Hiroshima (JP)

(72) Inventors: Noriyuki Ota, Hiroshima (JP); Yoshihisa Nou, Hiroshima (JP); Kazuaki Narahara, Hiroshima (JP); Takeshi Nagasawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 77 days.

(21) Appl. No.: 15/513,799

(22) PCT Filed: Nov. 5, 2015

(86) PCT No.: PCT/JP2015/005556
§ 371 (c)(1),
(2) Date: Mar. 23, 2017

(87) PCT Pub. No.: WO2016/079941
PCT Pub. Date: May 26, 2016

(65) Prior Publication Data
US 2018/0230896 A1    Aug. 16, 2018

(30) Foreign Application Priority Data
Nov. 18, 2014  (JP) .................................. 2014-233598

(51) Int. Cl.
*F02B 23/10* (2006.01)
*F02B 23/06* (2006.01)
*F02B 1/04* (2006.01)

(52) U.S. Cl.
CPC ............... *F02B 23/10* (2013.01); *F02B 1/04* (2013.01); *F02B 2023/102* (2013.01); *F02B 2275/02* (2013.01)

(58) Field of Classification Search
CPC .. Y02T 10/125; Y02T 10/146; F02B 23/0696; F02B 23/0624; F02B 23/0651;
(Continued)

(56) References Cited

U.S. PATENT DOCUMENTS

| 6,418,905 B1 | 7/2002 | Baudlot et al. |
| 2002/0033163 A1 | 3/2002 | Takashiba et al. |
| 2015/0144093 A1 | 5/2015 | Harada et al. |

FOREIGN PATENT DOCUMENTS

| JP | S60-19913 A | 2/1985 |
| JP | 2002-089267 A | 3/2002 |

(Continued)

OTHER PUBLICATIONS

International Search Report issued in PCT/JP2015/005556; dated Feb. 2, 2016.

*Primary Examiner* — Sizo Vilakazi
(74) *Attorney, Agent, or Firm* — Studebaker & Brackett PC

(57) ABSTRACT

A fuel injection valve is shifted, with respect to the bore center of a cylinder, toward one end of an engine's output shaft. A top surface of a piston has inclined surfaces, and is raised by the inclined surfaces. A cavity is formed by hollowing out portions of the inclined surfaces, and faces the injection axis of the fuel injection valve. In a vertical cross section taken along the plane passing through a particular location in an intake other-side region of a combustion chamber and the location of the fuel injection valve, the distance from an injection tip of the fuel injection valve to the wall surface of the cavity at the particular location is longer than that from the injection tip to the wall surface at a diametrically opposed location to the particular location.

7 Claims, 8 Drawing Sheets

(58) Field of Classification Search
CPC .............. F02B 23/0672; F02B 23/0645; F02B 23/0675; F02B 23/0684; F02B 23/0687; F02F 2001/245; F02F 1/24; F02F 2001/241

See application file for complete search history.

(56) References Cited

FOREIGN PATENT DOCUMENTS

| | | | |
|---|---|---|---|
| JP | 2002-511549 | A | 4/2002 |
| JP | 2004-190530 | A | 7/2004 |
| JP | 2005-155624 | A | 6/2005 |
| JP | 2013-194712 | A | 9/2013 |
| JP | 2015-102004 | A | 6/2015 |

# STRUCTURE OF COMBUSTION CHAMBER FOR DIRECT INJECTION ENGINE

TECHNICAL FIELD

The present disclosure relates to the structure of a combustion chamber for a direct-injection engine.

BACKGROUND ART

Patent Document 1 describes a spark-ignition direct-injection engine that injects fuel into a combustion chamber configured as a cavity, which is formed by recessing the top surface of a piston. This direct-injection engine accelerates combustion by adding ozone to intake air to be introduced into a cylinder. Flames spread from a central portion of the combustion chamber toward the periphery thereof as a spray of the fuel, injected through a fuel injection valve arranged at a bore center of the cylinder, scatters through the chamber. Before the flames reach the wall surface of the cavity, combustion is stopped. This forms a gas layer that does not contribute to combustion between a combustion gas in the central portion of the combustion chamber (i.e., in the cavity) and the wall surface of the cavity. This may significantly reduce the cooling loss. The direct-injection engine described in Patent Document 1 is further configured to have a high geometric compression ratio of higher than or equal to 15. This direct-injection engine improves the thermal efficiency significantly in cooperation with the above-described reduction in cooling loss.

The Applicant of this application proposed another technique for reducing the cooling loss in Patent Document 2. Specifically, in this technique, fuel is injected into a combustion chamber in the second half of a compression stroke, during which the fuel is injected in a specially designed manner. This forms an air-fuel mixture layer in a central portion of the combustion chamber, and also forms a heat-insulating gas layer around the air-fuel mixture layer, thus allowing the air-fuel mixture to be combusted in such a state. Note that the air-fuel mixture layer as used herein is a layer comprised of, and formed by, a combustible air-fuel mixture. The combustible air-fuel mixture may also be defined, for example, as an air-fuel mixture with an equivalence ratio φ of higher than or equal to 0.1. Forming, in the combustion chamber, the air-fuel mixture layer and the heat-insulating gas layer surrounding the air-fuel mixture layer allows the heat-insulating gas layer to reduce the contact between the combustion gas and the wall surface. Thus, the technique described in Patent Document 2 may reduce the cooling loss as significantly as the technique described in Patent Document 1.

According to the technique in which the air-fuel mixture layer and the heat-insulating gas layer surrounding the air-fuel mixture layer are formed in the combustion chamber, it is recommended that while a fuel injection valve is arranged such that its injection axis extends along the axis of a cylinder, a cavity symmetric with respect to the injection axis of the fuel injection valve be provided on a piston to face an injection tip of the fuel injection valve. The geometric compression ratio of an engine described in Patent Document 2 is also set to be higher than or equal to 15. The piston of the engine described in Patent Document 2 has a top surface, which has two inclined surfaces on intake and exhaust sides. Thus, the top surface is raised such that the two inclined surfaces form a triangular roof corresponding to a pent-roof-shaped surface of a cylinder head forming the ceiling surface of the combustion chamber. The cavity provided on a central portion of the top surface of the piston is formed by hollowing out portions of the inclined surfaces of the top surface of the piston.

CITATION LIST

Patent Document

PATENT DOCUMENT 1: Japanese Unexamined Patent Publication No. 2013-194712
PATENT DOCUMENT 2: Japanese Unexamined Patent Publication No. 2015-102004

SUMMARY OF THE INVENTION

Technical Problem

In a spark-ignition direct-injection engine, a spark plug is generally arranged near the bore center of a cylinder. When a fuel injection valve is to be arranged near the bore center, the fuel injection valve and the spark plug may be slightly shifted along the engine's output shaft from the bore center of the cylinder. To form a heat-insulating gas layer around an air-fuel mixture layer, a cavity provided on a piston is beneficially symmetric with respect to the injection axis of the fuel injection valve. Since the fuel injection valve is shifted from the bore center of the cylinder, the cavity is also shifted from the bore center of the cylinder. Forming the cavity on the top surface of the piston raised in the form of a triangular roof as described above makes the inclined surfaces partially hollowed out. Meanwhile, since the cavity is shifted from the bore center of the cylinder, the hollowed-out portions of the inclined surfaces also shift from the bore center of the cylinder.

According to the technique for reducing the contact between an air-fuel mixture layer and the wall surface of a combustion chamber by forming a heat-insulating gas layer around the air-fuel mixture layer, it is recommended that the gas flow in the combustion chamber be as weak as possible in the second half of the compression stroke in which fuel is injected into the combustion chamber. Thus, an intake port is designed to produce as weak a swirl or tumble flow as possible. However, even if such a countermeasure is taken, a weak tumble flow may remain in the combustion chamber in the second half of the compression stroke. The present inventors discovered, as a result of researches, that the tumble flow was deflected by the shift of the cavity on the top surface of the piston from the bore center of the cylinder. The present inventors also discovered that when an air-fuel mixture layer was formed by injecting fuel through a fuel injection valve in the second half of the compression stroke, the deflection of the tumble flow caused the air-fuel mixture layer to spread in a particular direction, and possibly come into contact with the wall surface of the combustion chamber (i.e., the wall surface of the cavity).

In view of the foregoing background, it is therefore an object of the present disclosure to allow a direct-injection engine having a combustion chamber including an air-fuel mixture layer and a heat-insulating gas layer to prevent the air-fuel mixture layer from spreading in a particular direction and coming into contact with the wall surface of the combustion chamber.

Solution to the Problem

First, it will be described in more detail with reference to FIG. 8 exactly how the above-described problem is caused by the spread of the air-fuel mixture layer in the particular direction. FIG. 8 corresponds to a plan view of a combustion chamber 17 defined by a portion of a cylinder head forming the ceiling of the combustion chamber, a top surface of a piston 16, and an inner peripheral surface of a cylinder 11 as viewed from above. The combustion chamber 17 is used herein in a broad sense of the term. The combustion chamber refers to not only a cylinder's internal space formed when the piston reaches its compression top dead center, but also a space defined by the portion of the cylinder head forming the ceiling of the combustion chamber, the top surface of the piston 16, and the inner peripheral surface of the cylinder 11.

The left side of the paper on which FIG. 8 is drawn corresponds to an exhaust side, and the right side of the paper corresponds to an intake side. The openings 180 of two intake ports indicated by associated two of the broken circles are arranged side by side along the engine's output shaft (i.e., in the upward/downward direction on the paper) on the intake side. Likewise, the openings 190 of two exhaust ports indicated by associated two of the broken circles are also arranged side by side along the engine's output shaft on the exhaust side as well. Although not clear from FIG. 8, the axes of throat portions of the intake ports are symmetric with respect to the bore center of the cylinder 11.

Although not clear from FIG. 8, the portion of the cylinder head forming the ceiling of the combustion chamber has an intake-side inclined surface and an exhaust-side inclined surface. The combustion chamber 17 forms a pent-roof-shaped combustion chamber. The top surface of the piston 16 has inclined surfaces respectively inclined on the intake and exhaust sides corresponding to the pent-roof-shaped ceiling. The top surface of the piston 16 is raised in the form of a triangular roof. Thus, the geometric compression ratio of the engine is set to be high.

A fuel injection valve 6 through which the fuel is injected into the combustion chamber 17 is arranged on the ridge line of the pent roof so as to be shifted, with respect to the bore center of the cylinder 11, toward one end of the engine's output shaft as indicated by the associated bold dashed line. As used herein, if something faces "toward one end of the engine's output shaft," it means that the thing is headed toward the bottom of the paper, e.g., toward the frontend of the engine. The injection axis of the fuel injection valve 6 extends along the axis of the cylinder 11 (i.e., in the direction coming out of the paper). A spark plug 7 is arranged on the ridge line of the pent roof so as to be shifted, with respect to the bore center of the cylinder 11, toward the other end of the engine's output shaft as indicated by the associated broken circle. As used herein, if something faces "toward the other end of the engine output shaft," it means that the thing is headed toward the top of the paper, e.g., toward the rear end of the engine.

The top surface of the piston 16 raised in the form of a triangular roof has a cavity 163, which is a recess having a substantially oval shape in a plan view. The center of the cavity 163 is set to agree with the injection axis of the fuel injection valve 6 so that an air-fuel mixture layer and a heat-insulating gas layer surrounding the air-fuel mixture layer are formed in the combustion chamber 17 (i.e., in the cavity 163). Thus, the substantially oval cavity 163 is shifted, with respect to the bore center of the cylinder 11, toward the one end of the engine's output shaft.

As described above, the two intake ports are arranged to be symmetric with respect to the bore center of the cylinder. The flows of the intake air flowing into the cylinder 11 through the openings 180 of the two intake ports (i.e., tumble flows) are uniform relative to the bore center of the cylinder 11. The two intake ports are each configured to produce as weak a tumble flow as possible so that the air-fuel mixture layer and the heat-insulating gas layer are formed.

The tumble flows once descend along the inner peripheral surface of the cylinder 11 on the exhaust side, and then change their direction toward the intake side at the top surface of the piston 16. Since the cavity 163 provided on the top surface of the piston 16 raised in the form of the triangular roof is shifted toward the one end of the engine's output shaft, portions of the inclined surfaces of the piston 16 which are hollowed out to form the cavity 163 are shifted, with respect to the bore center of the cylinder 11, toward the one end of the engine's output shaft. Those hollowed-out portions of the top surface of the piston 16 have a decreased height. The tumble flows pass more easily through those hollowed-out portions of the top surface of the piston 16 than through another relatively raised portion of its top surface with no cavity 163. This causes a downward component of each tumble flow to be deflected from the other end of the engine's output shaft on the exhaust side toward the one end of the engine's output shaft on the intake side as indicated by the bold dashed arrow in FIG. 8.

The deflected downward component of the tumble flow diverges into:

(1) a flow ascending along one of the inclined surfaces of the piston on the exhaust side (hereinafter referred to as a "first flow F1");

(2) a flow going upward along the sidewall of the cavity closer to the one end of the engine's output shaft in the cavity 163 after having entered the cavity 163 (hereinafter referred to as a "second flow F2"); and (3) a flow going along one of the inclined surfaces of the piston on the intake side toward the inner peripheral surface of the cylinder 11 after having passed through the cavity 163 (hereinafter referred to as a "third flow F3"), which are each indicated by an associated one of the one-dot-chain ellipses in FIG. 8.

As the piston 16 moves upward in the compression stroke, the upward second flow F2 is accelerated as indicated by an associated one of the open arrows. This produces a vertical vortex deflected from the other end of the engine's output shaft on the exhaust side toward the one end of the engine's output shaft on the intake side in the cavity 163. The first flow F1 serves as a squish flow going into the cavity 163 in the second half of the compression stroke as indicated by the associated open arrows. In addition, the third flow F3 diverges into two components respectively going toward the one and the other ends of the engine's output shaft, which flow along the inner peripheral surface of the cylinder 11 as indicated by the elongated open arrows. The third flow F3 does not go into the cavity 163 even in the second half of the compression stroke.

Providing the top surface of the piston 16 raised in the form of the triangular roof with the cavity 163 shifted toward the one end of the engine's output shaft makes the gas flow in the combustion chamber 17 in the second half of the compression stroke, during which the fuel is injected, in the state described above. In this state, the gas flow going into the cavity 163 attenuates adjacent to the vertical vortex in the cavity 163 in an area located closer to the other end of the engine's output shaft on the intake side. The air-fuel mixture layer formed by injecting the fuel through the fuel injection valve 6 tends to spread toward the other end of the engine's output shaft on the intake side as indicated by the arrow in FIG. 8. As a result, the air-fuel mixture layer may come into contact with the sidewall and/or bottom wall of the cavity 163 in that area. In other words, if the cavity 163 is shifted along the engine's output shaft, the air-fuel mixture layer tends to spread in the opposite direction from the direction of the shift on the intake side.

The present inventors perfected the present disclosure by discovering means for overcoming the problem described above. Specifically, the present inventors change the shape of a cavity only locally in a particular area where an air-fuel mixture layer tends to spread to prevent the air-fuel mixture layer from coming into contact with the wall surface.

Specifically, the present disclosure relates to a structure of a combustion chamber for a direct-injection engine. The structure includes: a piston inserted into a cylinder and having a cavity formed by recessing a top surface of the piston; a surface of a cylinder head forming a ceiling portion of the combustion chamber and having an intake-side inclined surface and an exhaust-side inclined surface, the ceiling portion being configured to define, along with the cylinder and the piston, a pent-roof-shaped combustion chamber, the intake-side inclined surface being provided with openings of two intake ports arranged side by side along an engine's output shaft, the exhaust-side inclined surface being provided with an opening of an exhaust port; and a fuel injection valve arranged on a ridge line of a pent roof at which the intake-side and exhaust-side inclined surfaces intersect with each other, the pent roof forming the ceiling portion of the cylinder head, the fuel injection valve being shifted, with respect to a bore center of the cylinder, toward one end of the engine's output shaft, the fuel injection valve having an injection axis that extends along an axis of the cylinder, the fuel injection valve being configured to inject fuel through an injection tip thereof into the cavity facing the injection tip.

The top surface of the piston has inclined surfaces on an intake side and an exhaust side, and is raised by the inclined surfaces to correspond to the intake-side and exhaust-side inclined surfaces of the ceiling portion. The cavity is shifted toward the one end of the engine's output shaft to face the injection axis of the fuel injection valve, the cavity being formed by hollowing out portions of the inclined surfaces. In a vertical cross section taken along a plane passing through a particular location in an intake other-side region and a location of the fuel injection valve, a distance from the injection tip of the fuel injection valve to a wall surface of the cavity at the particular location is longer than a distance from the injection tip to the wall surface of the cavity at a diametrically opposed location from the particular location with respect to the fuel injection valve, where the interior of the combustion chamber is divided, around the location of the fuel injection valve, into the four regions of: (1) an intake one-side region located on the intake side with respect to the ridge line of the pent roof and closer to the one end of the engine's output shaft; (2) an intake other-side region located on the intake side and closer to the other end of the engine's output shaft; (3) an exhaust one-side region located on the exhaust side with respect to the ridge line of the pent roof and closer to the one end of the engine's output shaft; and (4) an exhaust other-side region located on the exhaust side and closer to the other end of the engine's output shaft.

According to this configuration, the intake-side and exhaust-side inclined surfaces of the ceiling portion of the cylinder head define the pent-roof-shaped combustion chamber. The top surface of the piston is raised in the form of a triangular roof so to speak by the inclined surfaces on the intake and exhaust sides to correspond to the ceiling portion. Thus, the geometric compression ratio of this direct-injection engine is set to be relatively high. The geometric compression ratio may be higher than or equal to 15, for example. The ridge line of the pent roof sometimes passes through the bore center of the cylinder, but sometimes does not pass through the bore center.

The fuel injection valve that directly injects fuel into the combustion chamber is arranged on the ridge line of the pent roof forming the ceiling portion so as to be shifted, with respect to the bore center of the cylinder, toward the one end of the engine's output shaft. This layout is effectively applicable to arranging the fuel injection valve and a spark plug adjacent to each other near the bore center of the cylinder. Moreover, the fuel injection valve is arranged to have its injection axis extending along the axis of the cylinder.

The raised top surface of the piston has a recessed cavity. The cavity is formed by hollowing out the portions of the inclined surfaces. An air-fuel mixture layer is formed in the cavity by the fuel injected through the fuel injection valve.

The fuel injection valve is shifted toward the one end of the engine's output shaft, where the interior of the combustion chamber is divided into four regions around the location of the fuel injection valve (i.e., the intake one-side region, the intake other-side region, the exhaust one-side region, and the exhaust other-side region). The cavity is also shifted toward the one end of the engine's output shaft to face the fuel injection valve. The midpoint between one edge of the cavity which extends along the engine's output shaft and the other edge of the cavity just needs to be located on the injection axis of the fuel injection valve. Since the cavity is shifted, a tumble flow is deflected as described above. This allows the air-fuel mixture layer in the cavity to spread easily toward the periphery of the cavity in the intake other-side region opposite from the direction of shift of the cavity.

To address this problem, according to the configuration described above, in the vertical cross section taken along the plane passing through the particular location in the intake other-side region and the location of the fuel injection valve, the distance from the injection tip of the fuel injection valve to the wall surface of the cavity at the particular location is set to be longer than that from the injection tip to the wall surface of the cavity at the diametrically opposed location to the particular location with respect to the fuel injection valve. Note that the diametrically opposed location falls within the exhaust one-side region.

The air-fuel mixture in the cavity tends to spread toward the periphery of the cavity in the intake other-side region. However, the wall surface of the cavity is relatively distant from the injection tip of the fuel injection valve, thus decreasing the likelihood of accidental contact between the air-fuel mixture layer and the wall surface of the cavity. As a result, the cooling loss may be reduced. In this case, the particular location in the intake other-side region may be appropriately determined. Optionally, the distance from the injection tip of the fuel injection valve to the wall surface of the cavity may be longer in the entire intake other-side region than that from the injection tip to the wall surface of the cavity at the diametrically opposed location to the particular location in the exhaust one-side region. Moreover, the distance from the injection tip of the fuel injection valve to the wall surface of the cavity may be longer in a portion of the intake other-side region than that from the injection tip to the wall surface of the cavity at the diametrically opposed location to the particular location in the exhaust one-side region.

The distance from the injection tip to the wall surface of the cavity may be longer in the entire intake other-side region than that from the injection tip to the wall surface of the cavity in the exhaust one-side region. In that case, the particular location in the intake other-side region is an arbitrary location in the intake other-side region. Alternatively, the distance from the injection tip to the wall surface of the cavity may be longer in a portion of the intake other-side region than that from the injection tip to the wall surface of the cavity in the exhaust one-side region.

In this embodiment, the wall surface of the cavity includes a sidewall and a bottom wall of the cavity formed by recessing the top surface of the piston.

The cavity at the particular location may be shaped such that a sidewall of the cavity at the particular location is located closer to a periphery of the piston than the sidewall of the cavity at the diametrically opposed location is.

This makes the distance from the injection tip of the fuel injection valve to the sidewall of the cavity at the particular location in the intake other-side region longer than that from the injection tip to the sidewall of the cavity at the diametrically opposed location in the exhaust one-side region. This decreases the likelihood of contact between the air-fuel mixture layer formed in the cavity and the sidewall of the cavity.

The sidewall of the cavity is a portion of the cavity ranging from the boundary between itself and the top surface of the piston through the boundary between itself and the bottom wall of the cavity and defining an angle with respect to the top surface of the piston and the bottom wall of the cavity. When the sidewall of the cavity at the particular location is compared to the sidewall of the cavity at the diametrically opposed location at the same level in the vertical cross section, the sidewall of the cavity at the particular location may be closer to the periphery of the piston. For example, while the angle defined by the sidewall of the cavity at the particular location is equal to the one defined by the sidewall of the cavity at the diametrically opposed location, the sidewall of the cavity at the particular location may be located closer to the periphery of the piston. The sidewall of the cavity at the particular location may be brought closer to the periphery of the piston by making the sidewall of the cavity at the particular location define a different angle from the sidewall of the cavity at the diametrically opposed location. Alternatively, while the angle defined by the sidewall of the cavity at the particular location is set to be different from the one defined by the sidewall of the cavity at the diametrically opposed location, the sidewall of the cavity at the particular location may be bought closer to the periphery of the piston.

An opening edge of the cavity at the particular location may be located closer to the periphery of the piston than the opening edge of the cavity at the diametrically opposed location is.

In other words, as the sidewall of the cavity at the particular location is brought closer to the periphery of the piston, the opening edge of the cavity at the particular location may also be brought closer to the periphery of the piston.

The cavity at the particular location may be shaped such that a bottom wall of the cavity at the particular location is deeper than the bottom wall of the cavity at the diametrically opposed location.

This makes the distance from the injection tip of the fuel injection valve to the bottom wall of the cavity at the particular location in the intake other-side region longer than that from the injection tip to the bottom wall of the cavity at the diametrically opposed location in the exhaust one-side region. This decreases the likelihood of accidental contact between the air-fuel mixture layer formed in the cavity and the bottom wall of the cavity.

In this case, when comparison is made at two locations of the vertical cross section to which the radial distances from the injection tip of the fuel injection valve are equal to each other, the bottom wall of the cavity at the particular location may turn out to be deeper than the bottom wall of the cavity at the diametrically opposed location in the exhaust one-side region.

The shapes described above are each defined at least such that the shape of the wall surface of the cavity in the intake other-side region is different from that of the wall surface of the cavity in the exhaust one-side region. The shape of the wall surface of the cavity in the intake one-side region and the cavity shape in the exhaust other-side region are not specifically defined. For example, if only the shape of the wall surface of the cavity in the intake other-side region is set to be different from the shape of the wall surface of the cavity in any of the other three regions, the overall shape of the cavity is asymmetric.

Unlike the shapes described above, the cavity may be symmetric with respect to the ridge line of the pent roof, and may have an oval shape elongated along the engine's output shaft. A distance from the fuel injection valve to an edge of the cavity closer to the other end of the engine's output shaft may be longer than a distance from the fuel injection valve to the edge of the cavity closer to the one end of the engine's output shaft.

In this embodiment, the oval shape is used in a broad sense of the term. The oval shape as used herein includes an oblong shape defined by a smoothly continuous curve or a combination of curves and straight lines and having no end, as well as an oval shape forming a locus of points, to each of which the sum of the distances from two fixed points on one plane is constant.

According to the configuration described above, the cavity has an oval shape symmetric with respect to the ridge line of the pent roof, and the distance from the fuel injection valve to the edge of the cavity located closer to the other end of the engine's output shaft is longer than that from the injection valve to the edge of the cavity located closer to the one end of the engine's output shaft. Thus, the distance from the injection tip of the fuel injection valve to the sidewall of the cavity in at least the intake other-side region is longer than that from the injection tip to the sidewall of the cavity in the exhaust one-side region and in the intake one-side region. This prevents the air-fuel mixture layer formed in the cavity from coming into contact with the wall surface of the cavity as in the configuration described above.

In the configuration described above, the distance from the injection tip of the fuel injection valve to the sidewall of the cavity in not only the intake other-side region but also the exhaust other-side region is longer than that from the injection tip to the sidewall of the cavity in the exhaust one-side region and the intake one-side region. The cavity thus formed is shaped such that the cavity shifted toward the one end of the engine's output shaft to face the location of the fuel injection valve is extended toward the other end of the engine's output shaft. The midpoint between the edge of the cavity located closer to the one end of the engine's output shaft and the edge thereof located closer to the other end thereof is shifted, with respect to the bore center of the cylinder, toward the one end of the engine's output shaft.

Extending the cavity toward the other end of the engine's output shaft allows a hollowed-out portion of the exhaust-side inclined surface at the top surface of the piston, which is formed by the cavity, to extend toward the other end of the engine's output shaft. This reduces the deflection of the tumble flow described above. This substantially prevents the air-fuel mixture layer in the cavity from spreading outward in the intake other-side region. The configuration described above helps prevent the air-fuel mixture layer from coming into contact with the wall surface of the cavity.

Advantages of the Invention

According to the structure of the combustion chamber for the direct-injection engine, the direct-injection engine including a fuel injection valve shifted toward one end of an engine's output shaft is designed such that a wall surface of a cavity of a piston having a raised top surface is located distant from an injection tip of the fuel injection valve at a particular location in an intake other-side region. This may prevent an air-fuel mixture layer formed in the cavity from coming into contact with the wall surface of the cavity and may reduce the cooling loss even if the air-fuel mixture layer spreads in a particular direction.

BRIEF DESCRIPTION OF THE DRAWINGS

FIG. 4(a) is a plan view, FIG. 4(b) is a vertical cross-sectional view taken in an intake/exhaust direction, FIG. 4(c) is a vertical cross-sectional view taken along an engine's output shaft, and FIG. 4(d) is a vertical cross-sectional view covering a particular location and a diametrically opposed location to the particular location.

FIG. 5(a) is a plan view, FIG. 5(b) is a vertical cross-sectional view taken in an intake/exhaust direction, FIG. 5(c) is a vertical cross-sectional view taken along an engine's output shaft, and FIG. 5(d) is a vertical cross-sectional view covering a particular location and a diametrically opposed location to the particular location.

FIG. 6(a) is a plan view, FIG. 6(b) is a vertical cross-sectional view taken in an intake/exhaust direction, FIG. 6(c) is a vertical cross-sectional view taken along an engine's output shaft, and FIG. 6(d) is a vertical cross-sectional view covering a particular location and a diametrically opposed location to the particular location.

DESCRIPTION OF EMBODIMENTS

Embodiments will now be described with reference to the drawings. Note that the following description is an example.

(Entire Configuration for Engine)

Figure 1:
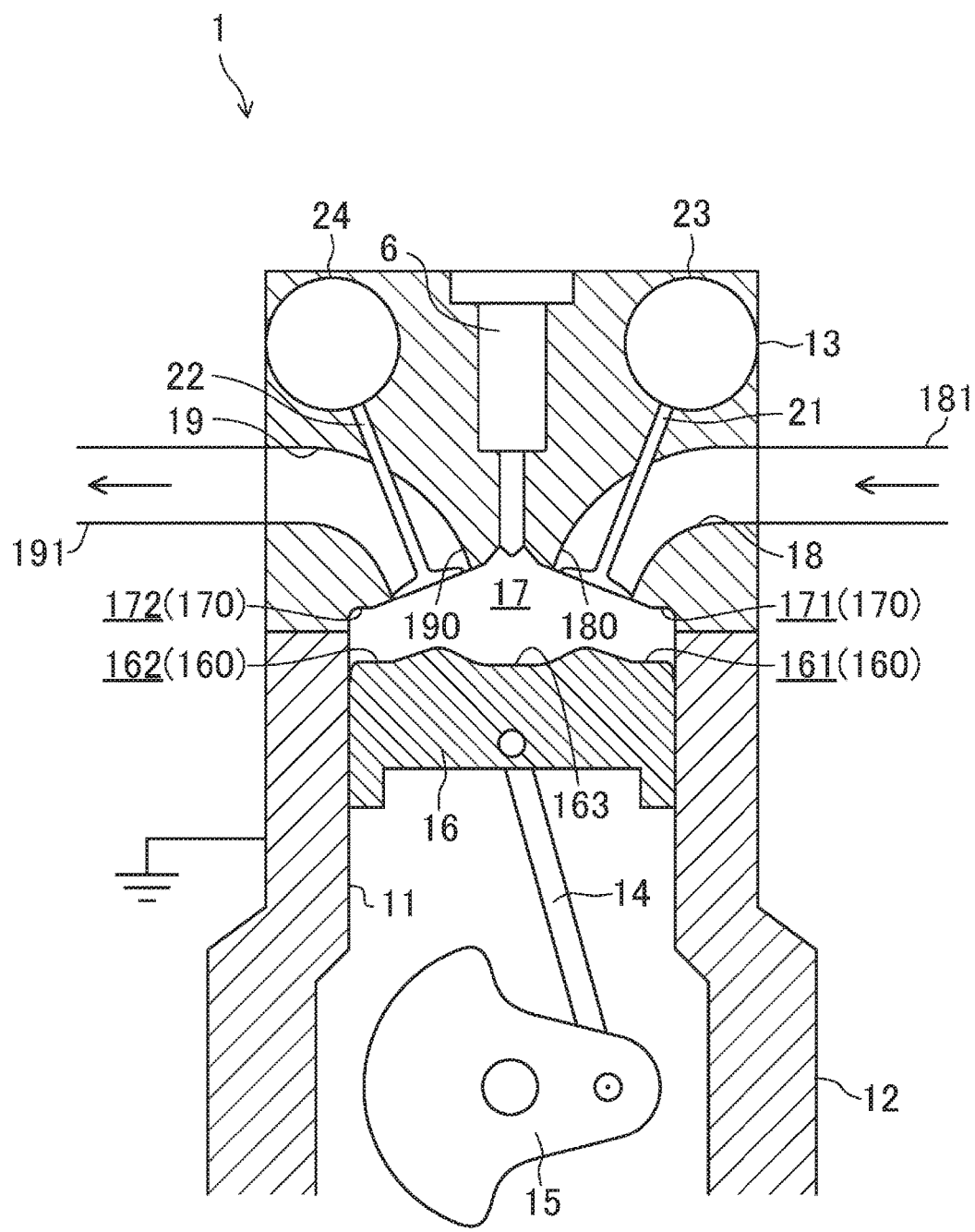
FIG. 1 is a schematic view illustrating a configuration for an engine.

FIG. 1 illustrates a configuration for an engine 1 according to an embodiment. Although not shown, a crankshaft 15 of the engine 1 is coupled to driving wheels through a transmission. Transmitting the output of the engine 1 to the driving wheels propels a vehicle. In this embodiment, fuel for the engine 1 is gasoline. However, the fuel may also be gasoline containing bioethanol, for example, and may be any fuel as long as it is a liquid fuel containing at least gasoline.

The engine 1 includes a cylinder block 12, and a cylinder head 13 mounted on the cylinder block 12. A plurality of cylinders 11 are formed inside the cylinder block 12. Only one of these cylinders is illustrated in FIG. 1. The engine 1 is a multi-cylinder engine. Although not shown, a water jacket, in which cooling water runs, is formed inside the cylinder block 12 and the cylinder head 13. A piston 16 is slidably fitted into each of the cylinders 11. The piston 16 is coupled to the crankshaft 15 through a connecting rod 14. The piston 16 defines a combustion chamber 17 along with the cylinder 11 and the cylinder head 13.

In this embodiment, a ceiling portion 170 of the combustion chamber 17 (a lower surface of the cylinder head 13) has an intake-side inclined surface 171 and an exhaust-side inclined surface 172, which are inclined upward toward the center of the cylinder 11. The intake-side inclined surface 171 communicates with the opening 180 of an intake port 18. The exhaust-side inclined surface 172 communicates with the opening 190 of an exhaust port 19. The combustion chamber 17 is a pent-roof-shaped combustion chamber. The ridge line of the pent roof sometimes passes through the bore center of the cylinder 11, but sometimes does not. A top surface 160 of the piston 16 has inclined surfaces 161 and 162, which are inclined upward toward the center of the piston on the intake and exhaust sides, respectively. The top surface is raised such that the inclined surfaces 161 and 162 form a triangular roof. The inclined surface 161 corresponds to the intake-side inclined surface 171 of the ceiling portion 170. The inclined surface 162 corresponds to the exhaust-side inclined surface 172 of the ceiling portion 170. Thus, the geometric compression ratio of the engine 1 is set to be high, i.e., higher than or equal to 15. The top surface 160 of the piston 16 has a recessed cavity 163. The shape of the top surface 160 of the piston 16 will be described below in detail.

Although only one of the intake ports is illustrated in FIG. 1, two intake ports 18 are actually provided for the cylinder head 13 of each cylinder 11. The intake-side inclined surface 171 of the cylinder head 13 is provided with openings 180 of the intake ports 18, which are arranged side by side along the engine's output shaft (i.e., along the crankshaft 15) (see FIG. 4(a)). The intake ports 18 communicate with the combustion chamber 17 through the respective openings 180. The openings 180 of the two intake ports 18 are arranged symmetrically with respect to the bore center of the cylinder 11. Although not clearly shown in FIG. 4, the axes of throat portions of the intake ports 18 are defined symmetrically with respect to the bore center of the cylinder 11. Likewise, two exhaust ports 19 are provided for the cylinder head 13 of each cylinder 11. The exhaust-side inclined surface 172 of the cylinder head 13 is provided with the openings 190 of the exhaust ports 19, which are arranged side by side along the engine's output shaft (see FIG. 4(a)). The exhaust ports 19 communicate with the combustion chamber 17 through the respective openings 190. The openings 190 of the two exhaust ports 19 are arranged symmetrically with respect to the bore center of the cylinder 11.

The intake ports 18 are each connected to an intake passage 181. Although not shown, the intake passage 181 is provided with a throttle valve which controls the flow rate of intake air. The exhaust ports 19 are each connected to an exhaust passage 191. Although not shown, the exhaust passage 191 is provided with an exhaust gas purifying system having one or more catalyst converters. The catalyst converter contains a three-way catalyst.

The cylinder head 13 is provided with intake valves 21, which each shut off (or close) an associated one of the intake ports 18 from the combustion chamber 17. Each intake valve 21 is driven by an intake valve drive mechanism. The cylinder head 13 is also provided with exhaust valves 22, which each shut off (or close) an associated one of the exhaust ports 19 from the combustion chamber 17. Each exhaust valve 22 is driven by an exhaust valve drive mechanism. The intake valve 21 reciprocates at predetermined timings to open and close the intake port 18. The exhaust valve 22 reciprocates at predetermined timings to open and close the exhaust port 19. In this manner, gas is exchanged in the cylinder 11.

Although not shown, the intake valve drive mechanism includes an intake camshaft that is drivably coupled to the crankshaft 15. The intake camshaft rotates in synchronization with the crankshaft 15 rotating. In this example, the intake valve drive mechanism includes at least a hydraulic or electric variable valve timing (VVT) mechanism 23 capable of continuously changing the phase of the intake camshaft within a predetermined angular range. The intake valve drive mechanism may include, in addition to the VVT mechanism 23, a variable valve lift mechanism capable of changing the valve lift amount. The variable valve lift mechanism may be a continuous variable valve lift (CVVL) mechanism capable of continuously changing the valve lift amount. Likewise, although not shown, the exhaust valve drive mechanism includes an exhaust camshaft that is drivably coupled to the crankshaft 15. The exhaust camshaft rotates in synchronization with the crankshaft 15 rotating. In this example, the exhaust valve drive mechanism also includes at least a hydraulic or electric VVT mechanism 24. The exhaust valve drive mechanism may include, in addition to the VVT mechanism 24, a variable valve lift mechanism capable of changing the valve lift amount. The variable valve lift mechanism may be a CVVL mechanism capable of continuously changing the valve lift amount.

The valve drive mechanisms that drive the intake valves 21 and the exhaust valves 22 may be of any type. Examples of adoptable valve drive mechanisms include hydraulic and electromagnetic drive mechanisms.

Figure 2:
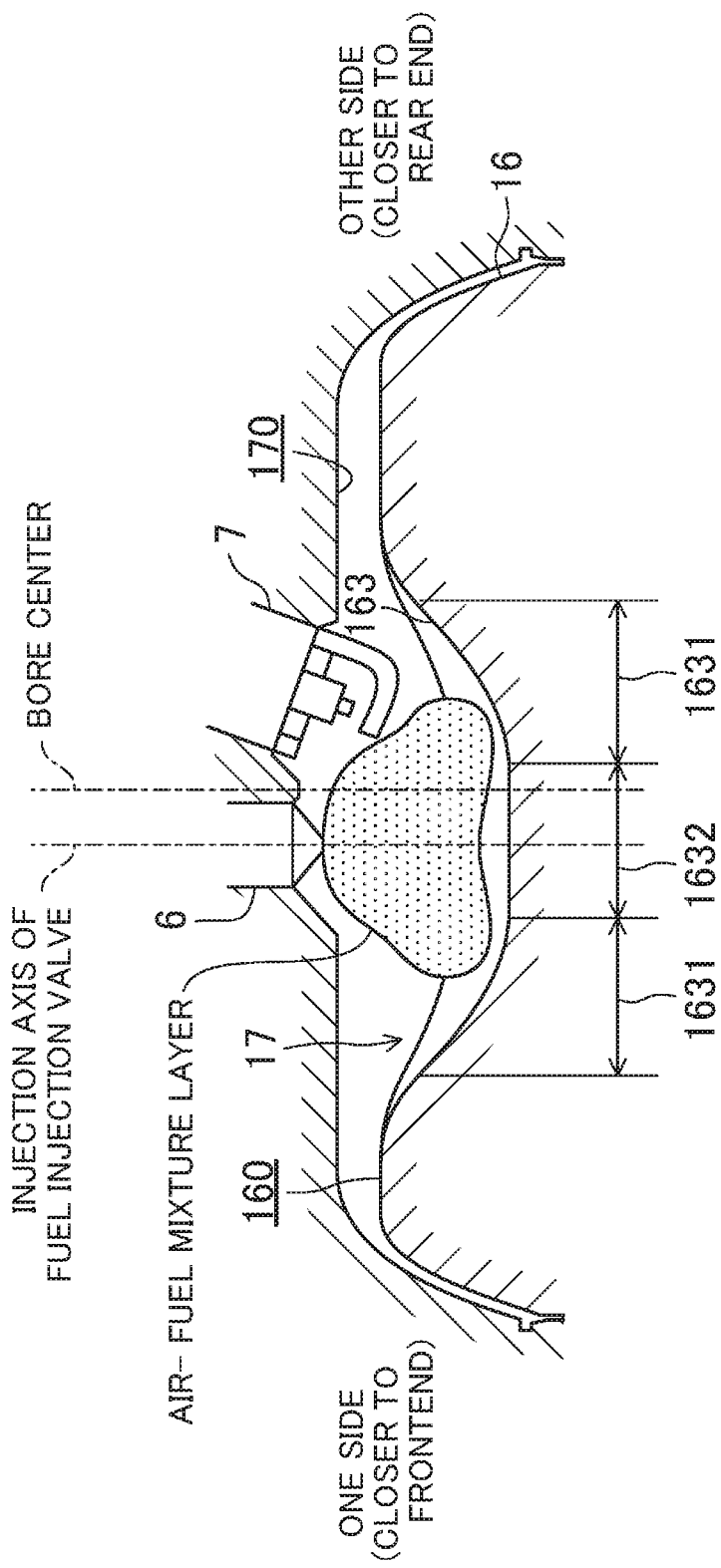
FIG. 2 is a vertical cross-sectional view illustrating a configuration for a combustion chamber and taken along an engine's output shaft.

A fuel injection valve 6 that directly injects fuel into the combustion chamber 17 is attached to the cylinder head 13. The fuel injection valve 6 is arranged on the ridge line of the pent roof at which the intake-side and exhaust-side inclined surfaces 171 and 172 intersect with each other. As shown in FIG. 2, the fuel injection valve 6 is shifted, with respect to the bore center of the cylinder 11, toward one end of the engine's output shaft. The one end of the engine's output shaft is the left side of the paper on which FIG. 2 is drawn. In this embodiment, this side corresponds to the so-called front side of the engine, i.e., one side of the engine 1 opposite from the transmission. The fuel injection valve 6 has an injection axis extending along the axis of the cylinder 11, and an injection tip facing the interior of the combustion chamber 17. The cavity 163 of the piston 16 is provided to face the fuel injection valve 6. The fuel injection valve 6 injects fuel into the cavity 163.

As will be described in detail later, the fuel injection valve 6 is configured such that an air-fuel mixture layer (combustible) and a heat-insulating gas layer surrounding the air-fuel mixture layer may be formed in the combustion chamber 17 (i.e., in the cavity 163), as conceptually shown in FIG. 2. The fuel injection valve 6 may be an outwardly-opening fuel injection valve, for example. The outwardly-opening fuel injection valve may adjust the lift amount to change the particle size of the fuel spray to be injected. As disclosed in Patent Document 2 (Japanese Unexamined Patent Publication No. 2015-102004), the characteristics of the outwardly-opening fuel injection valve may be taken advantage of to appropriately control the multi-stage injection-based mode of fuel injection, thereby adjusting the swath of the fuel spray in the traveling direction thereof and the spread of the fuel spray along the injection axis. If fuel is injected at a timing when the piston is around the compression top dead center, the air-fuel mixture layer may be formed in a central portion of the cavity 163, and a heat-insulating gas layer may be formed to surround the air-fuel mixture layer. If not only the outwardly-opening fuel injection valve but also a valve covered orifice (VCO) nozzle type injector adjust the degree of cavitation occurring at a nozzle port, the particle size of the fuel spray to be injected may be changed by changing an effective cross-sectional area of the nozzle hole. As can be seen, if, just like the outwardly-opening fuel injection valve, the VCO nozzle type injector also adjusts the swath of the fuel spray in the traveling direction thereof and the spread of the fuel spray along the injection axis at the timing when the piston is around the compression top dead center, the air-fuel mixture layer may be formed in the central portion of the cavity 163, and the heat-insulating gas layer may be formed to surround the air-fuel mixture layer.

Also, if the fuel heated to a predetermined temperature with a heater is injected into the combustion chamber 17 with high-pressure atmosphere so as to be brought into a supercritical state, the air-fuel mixture layer may be formed in the central portion of the cavity 163, and the heat-insulating gas layer may be formed to surround the air-fuel mixture layer. In this technique, instantaneous vaporization of the fuel injected into the combustion chamber 17 reduces the penetration of the fuel spray, thus forming the air-fuel mixture layer in a portion of the cavity 163 near the fuel injection valve 6 as shown in FIG. 2. Note that the fuel injection valve is configured as, for example, a multi-hole fuel injection valve having a plurality of nozzle holes and including a heater that heats the fuel. The fuel injection valve may also have any other configuration. A configuration for such a fuel injection valve has been known, and will not be described in detail.

A spark plug 7 is fitted into the cylinder head 13. As shown in FIG. 2, the spark plug 7 is arranged on the ridge line of the pent roof so as to be shifted, with respect to the bore center of the cylinder 11, toward the other end of the engine's output shaft (i.e., toward the rear end of the engine). The spark plug 7 is inclined toward the fuel injection valve 6 relative to the axis of the cylinder 11. Thus, the fuel injection valve 6 and the spark plug 7 are arranged close to each other near the bore center of the cylinder 11.

As described above, the geometric compression ratio ε of the engine 1 is set to be higher than or equal to 15. The geometric compression ratio may be lower than or equal to 40, and is suitably higher than or equal to 20 and lower than or equal to 35. In the engine 1, as its compression ratio increases, its expansion ratio increases. Thus, the engine 1 has a high compression ratio and a relatively high expansion ratio at the same time. The engine 1 is basically configured to burn the fuel injected into the cylinder 11 in the entire operation range by compression ignition. The high geometric compression ratio stabilizes the compression ignition combustion.

The combustion chamber 17 is defined by the inner peripheral surface of the cylinder 11, the top surface 160 of the piston 16, the lower surface of the cylinder head 13 (the ceiling portion 170), and the valve head surfaces of the intake valves 21 and the exhaust valves 22. Heat shield layers are respectively provided at the above-mentioned defining surfaces to cut down the cooling loss. This insulates the combustion chamber 17 from heat. The heat shield layers may be provided on all or only some of these defining surfaces. Moreover, the heat shield layers may also be provided on the wall surfaces of the intake ports 18 and the exhaust ports 19 near the openings at the ceiling portion 170 of the combustion chamber 17, although such wall surfaces are not the wall surfaces directly defining the combustion chamber 17.

These heat shield layers are designed to have lower thermal conductivity than base metal members forming the combustion chamber 17 to substantially prevent the heat of the combustion gas in the combustion chamber 17 from being dissipated through the defining surfaces.

The heat shield layers beneficially have lower volumetric specific heat than the base members to reduce the cooling loss. Specifically, it is recommended that the thermal capacity of the heat shield layers be reduced so that the temperature of the surfaces defining the combustion chamber 17 varies in accordance with the change of the gas temperature in the combustion chamber 17.

The heat shield layers may be formed by coating a base member with a ceramic material, such as $ZrO_2$, by plasma spray coating. The ceramic material may have a large number of pores. This may further reduce the thermal conductivity and volumetric specific heat of the heat shield layers.

In this embodiment, in addition to the above-described heat shield structure in the combustion chamber 17, heat-insulating layers (e.g., gas layers) formed in the cylinder (i.e., in the combustion chamber 17) significantly reduce the cooling loss.

Specifically, the fuel injection valve 6 injects fuel through the injection tip of the fuel injection valve 6 into the cavity 163 on and after the compression stroke. Thus, the multiple layers are formed as intended. Specifically, as shown in FIG. 2, the air-fuel mixture layer is formed in the central portion of the cavity 163 near the fuel injection valve 6, and the gas layer containing fresh air is formed to surround the air-fuel mixture layer. The gas layer may consist essentially of fresh air, or may contain some burned gas (EGR gas) in addition to fresh air. Mixing a small amount of fuel into the gas layer would cause no problem. The gas layer merely needs to be leaner than the air-fuel mixture layer to function as a heat-insulating layer.

If fuel is burned by compression ignition with the gas layer and the air-fuel mixture layer formed as described above, the gas layer between the air-fuel mixture layer and the wall surface of the cylinder 11 prevents the flames of the air-fuel mixture layer from reaching the wall surface of the cylinder 11. Moreover, the gas layer itself serves as a heat-insulating layer, and hence prevents heat from being dissipated from the wall surfaces of the combustion chamber 17. As a result, the cooling loss decreases significantly.

Merely reducing the cooling loss does not greatly contribute to enhancement in the indicated thermal efficiency, since the reduced cooling loss is converted to the exhaust loss. However, the engine 1 efficiently converts the energy of the combustion gas corresponding to the reduced cooling loss into mechanical work, due to an increase in expansion ratio caused by an increase in compression ratio. That is, the engine 1 significantly enhances the indicated thermal efficiency by employing the structure that reduces both of the cooling loss and the exhaust loss.

To form such an air-fuel mixture layer and such a gas layer in the combustion chamber 17, the gas flow intensity in the combustion chamber 17 is beneficially low at the timing of injecting the fuel. Thus, the intake ports have a straight shape that does not form a swirl in the combustion chamber 17 or makes it difficult to cause a swirl, and is designed to minimize the intensity of the tumble flow.

Figure 3:
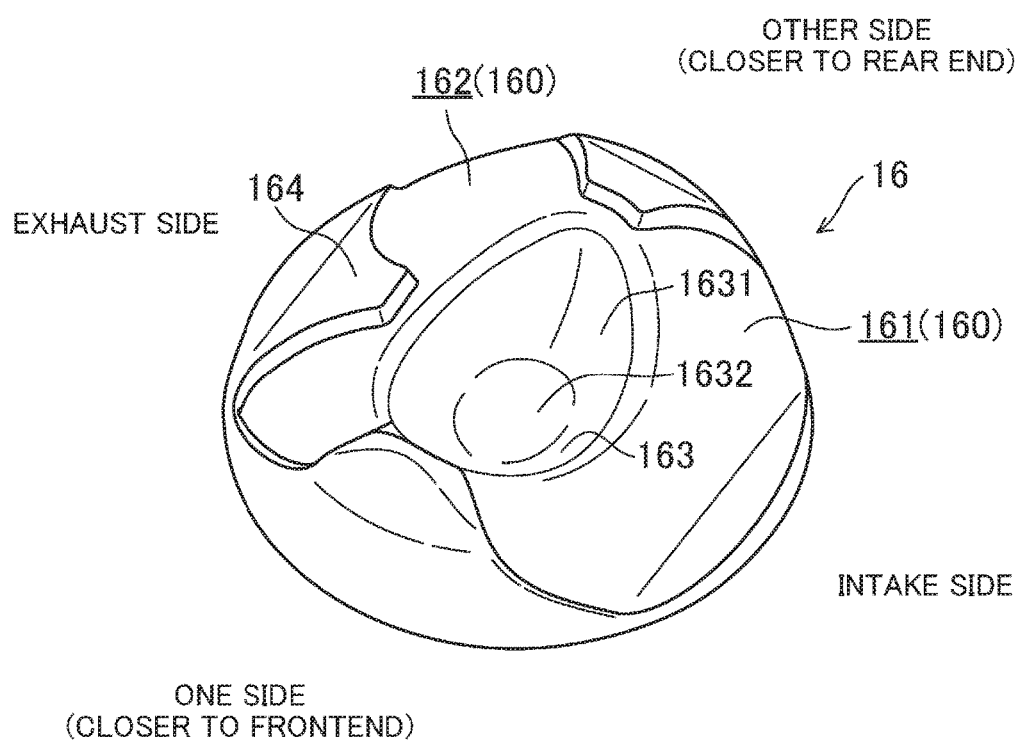
FIG. 3 is a perspective view illustrating the shape of a top surface of a piston.

Next, the shape of the top surface of the piston forming the combustion chamber will be described in more detail with reference to the drawings. FIG. 3 is a perspective view illustrating the shape of the top surface of the piston 16. The near right side of the paper on which FIG. 3 is drawn is an intake side, the far left side thereof is an exhaust side, the near left side thereof is one end of the engine's output shaft (i.e., the frontend of the engine), and the far right side thereof is the other end of the engine's output shaft (i.e., the rear end of the engine).

As described above, the top surface 160 of the piston 16 has the intake-side and exhaust-side inclined surfaces 161 and 162, which are inclined upward toward the center of the piston 16. Thus, when the piston 16 is viewed from the one end of the engine's output shaft along the engine's output shaft, the top surface of the piston 16 forms the shape of a triangular roof, which is gradually raised from each of its lateral sides toward its central portion. The intake-side and exhaust-side inclined surfaces 161 and 162 each have a valve recess. Among these surfaces, the intake-side inclined surface 161 has a portion which faces the region between valve heads of the two intake valves 21 arranged side by side along the engine's output shaft and which is hollowed out along with the valve recess. The intake-side inclined surface 161 has the valve recess but forms a substantially flat surface. On the other hand, the exhaust-side inclined surface 162 has a portion which faces the region between valve heads of the two exhaust valves 22 arranged side by side along the engine's output shaft and which stays intact without being hollowed out. This portion functions as a squish area 164 where a squish flow from the exhaust side toward the center of the combustion chamber 17 is generated when the piston 16 reaches a point near its top dead center.

As shown also in FIG. 2, both lateral end portions of the top surface 160 of the piston 16 along the engine output shaft, which are located near the ridge line of the top surface, are curved so that the piston diameter decreases toward the top surface 160. This curved shape corresponds to the shape of the curved ceiling portion 170 of the cylinder head 13. This helps increase the geometric compression ratio of the engine 1 effectively.

As described above, the top surface 160 of the piston 16 has the recessed cavity 163. As shown in FIG. 2, the diameter of the cavity 163 gradually decreases from the opening edge of the cavity toward the bottom thereof. The cavity 163 has a sidewall 1631 continuous with the top surface 160 of the piston 16, and a bottom wall 1632 continuous with the sidewall 1631. As shown in FIG. 2, in a vertical cross-section passing through the center of the piston 16, the cavity 163 has a bathtub-like shape. The sidewall 1631 has a different angle from the top surface 160 of the piston 16 and the bottom wall 1632. A portion of the piston 16 between the top surface 160 and the sidewall 1631 and a portion of the piston 16 between the sidewall 1631 and the bottom wall 1632 are both rounded portions with a radius of curvature.

In the following description, the rounded portion between the top surface 160 of the piston 16 and the sidewall 1631 is supposed to be included in the top surface 160 of the piston 16, and the region where the rounded portion and the sidewall 1631 are in contact with each other is thus defined as the boundary between the top surface 160 and the sidewall 1631. This boundary constitutes the opening edge of the cavity 163. On the other hand, the rounded portion between the sidewall 1631 and the bottom wall 1632 is supposed to be included in the sidewall 1631, and the region where the rounded portion and the bottom wall 1632 are in contact with each other is defined as the boundary between the sidewall 1631 and the bottom wall 1632. Note that the boundary between the top surface 160 and the sidewall 1631 and the boundary between the sidewall 1631 and the bottom wall 1632 may also be each defined differently. For example, the rounded portion between the top surface 160 and the sidewall 1631 may also be supposed to be included in the sidewall 1631, and the region where the top surface 160 and the rounded portion are in contact with each other may be thus defined as the boundary between the top surface 160 and the sidewall 1631. The centerline of the rounded portion may also be defined as the boundary between the top surface 160 and the sidewall 1631. Likewise, the rounded portion between the sidewall 1631 and the bottom wall 1632 may also be supposed to be included in the bottom wall 1632, and the region where the rounded portion and the sidewall 1631 are in contact with each other may be defined as the boundary between the sidewall 1631 and the bottom wall 1632. Alternatively, the centerline of the rounded portion may also be defined as the boundary between the sidewall 1631 and the bottom wall 1632. All features of the shape of the cavity in the following description may hold true, irrespective of how the top surface 160, the sidewall 1631, and the bottom wall 1632 are defined.

Figure 4:
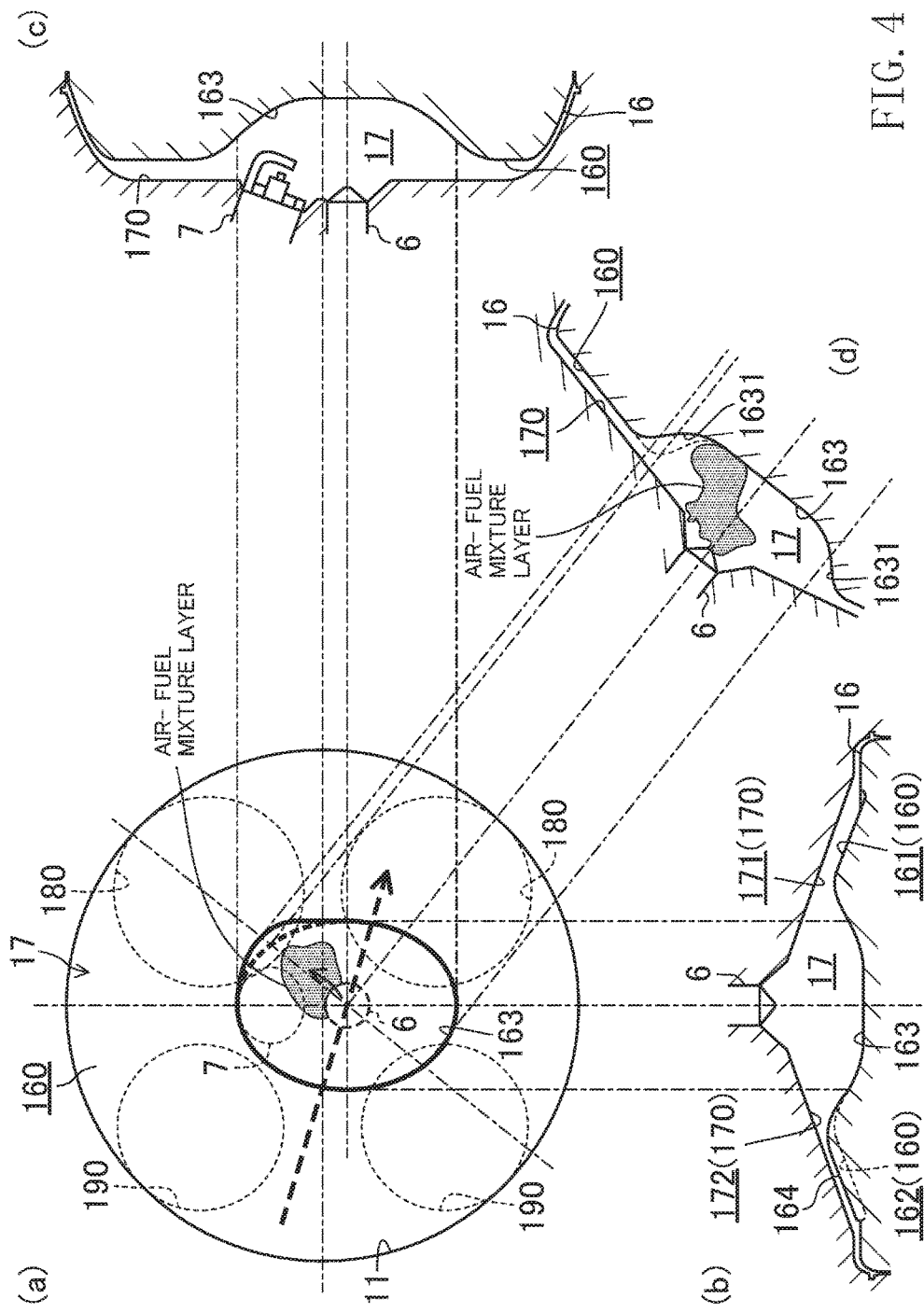
FIGS. 4(a)-4(d) illustrate a configuration for a cavity formed on a top surface of a piston.

As shown in FIG. 3, the cavity 163 has a substantially oval opening edge. The term "oval" is used herein in a broad sense of the term. As shown in FIGS. 2 and 4, the cavity 163 is provided such that its center (more precisely, defined by the midpoint of a widest portion of the cavity 163 between respective ends thereof on the intake and exhaust sides and the midpoint between respective ends thereof located closer to the one and the other ends of the engine's output shaft) agrees with the injection axis of the fuel injection valve 6. This helps form the air-fuel mixture layer in the central portion of the cavity 163 effectively as described above. Since the injection axis of the fuel injection valve 6 is shifted toward the one end of the engine's output shaft, the cavity 163 is also shifted, with respect to the center of the piston 16, toward the one end of the engine's output shaft when viewed from over the top surface 160 of the piston 16.

Since the cavity 163 is formed on the top surface 160 of the piston 16 raised in the form of the triangular roof, a portion of the intake-side inclined surface 161 and a portion of the exhaust-side inclined surface 162 are both hollowed out to form the cavity 163 as can be seen also from FIG. 3. Since the cavity 163 is shifted, the hollowed-out portions of the intake-side and exhaust-side inclined surfaces 161 and 162 are not symmetric with respect to the bore center of the cylinder 11 but are also shifted toward the one end of the engine's output shaft, as shown in FIG. 2. Since the cavity 163 is shifted toward the one end of the engine's output shaft, one of ridge line portions of the top surface 160 of the piston 16 staying intact at both sides of the cavity 163 which is located closer to the one end of the engine's output shaft is relatively short, and the other ridge line portion located closer to the other end of the engine's output shaft is relatively long.

Figure 8:
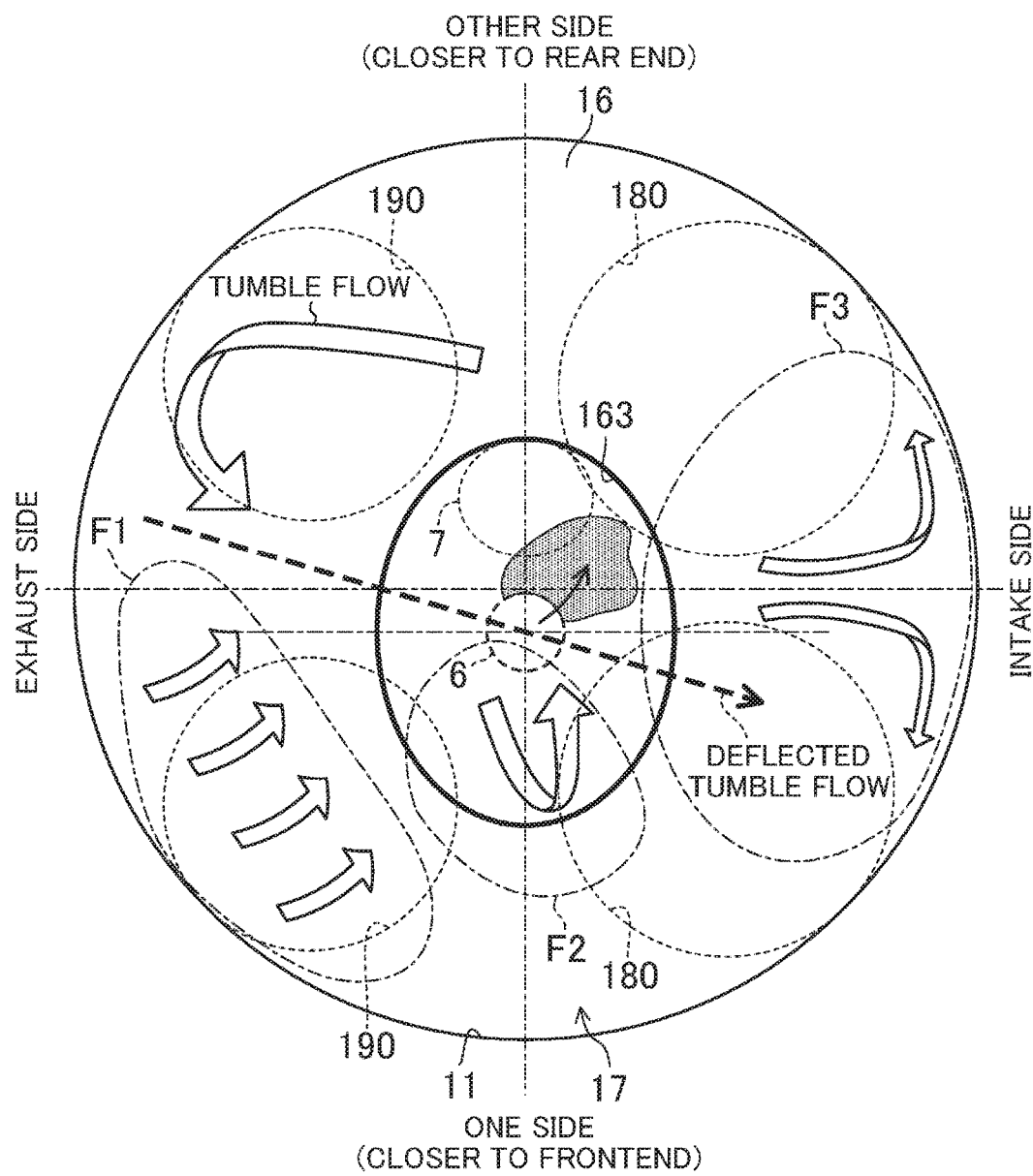
FIG. 8 is a plan view showing gas flows in a combustion chamber.

As described above, the engine 1 is designed so that the gas flow is attenuated in the combustion chamber 17. However, a weak tumble flow may be generated in the combustion chamber 17. Since the top surface 160 of the piston 16 raised in the form of the triangular roof has the substantially oval cavity 163 shifted toward the one end of the engine's output shaft, a tumble flow tends to be directed toward the cavity 163 shifted with respect to the bore center of the cylinder 11 as described with reference to FIG. 8. As indicated by the bold dashed arrow in FIG. 4(*a*), the tumble flow is deflected in the combustion chamber 17 from the other end of the engine's output shaft on the exhaust side toward the one end of the engine's output shaft on the intake side.

Due to the deflection of the tumble flow, the air-fuel mixture layer formed in the cavity 163 by the fuel injected through the fuel injection valve 6 tends to spread toward the other end of the engine's output shaft on the intake side as indicated by the solid arrow in FIG. 4(*a*). This increases the risk of the air-fuel mixture layer's contacting with the wall surface of the cavity 163. To avoid this risk, modifying the shape of the cavity 163 formed on the piston 16 of the engine 1 prevents the air-fuel mixture layer from coming into contact with the wall surface of the cavity 163.

As shown in FIG. 4(*a*), the interior of the combustion chamber 17 is divided, around the location of the fuel injection valve 6, into the four regions of: (1) an intake one-side region located on the intake side with respect to the ridge line of the pent roof and closer to the one end of the engine's output shaft (the lower right region shown in portion (a) of FIG. 4); (2) an intake other-side region located on the intake side and closer to the other end of the engine's output shaft (the upper right region shown in portion (a) of FIG. 4); (3) an exhaust one-side region located on the exhaust side with respect to the ridge line of the pent roof and closer to the one end of the engine's output shaft (the lower left region shown in portion (a) of FIGS. 4); and (4) an exhaust other-side region located on the exhaust side and closer to the other end of the engine's output shaft (the upper left region shown in portion (a) of FIG. 4). In the vertical cross section taken along the plane passing through a particular location in the intake other-side region and the location of the fuel injection valve 6 (see FIG. 4(*d*)), the distance from the injection tip of the fuel injection valve 6 to the wall surface of the cavity 163 at the particular location (the wall surface shown on the upper right side of FIG. 4(*d*)) is set to be longer than that from the injection tip to the wall surface of the cavity 163 at a diametrically opposed location to the particular location with respect to the fuel injection valve 6 (the wall surface shown on the lower left side of FIG. 4(*d*)). A segment of the solid line shown on the upper right side of the paper on which FIG. 4(*d*) is drawn indicates the sidewall 1631 of the cavity 163 at the particular location, and the broken line shown thereon indicates the sidewall 1631 of the cavity 163 at the diametrically opposed location. In other words, the broken line corresponds to a mirror image of the sidewall 1631 shown on the lower left side of the paper on which FIG. 4(*d*) is drawn. As shown in FIG. 4(*d*), the sidewall 1631 of the cavity 163 has its boundary with respect to its bottom wall 1632 defined at the same distance from the injection axis both at the particular and diametrically opposed locations alike. However, the sidewall 1631 of the cavity 163, including the rounded portion, is designed to be more inclined downward (i.e., form a smaller angle relative to the horizontal plane) at the particular location than at the diametrically opposed location. As a result, the sidewall 1631 at the particular location is located closer to the periphery of the piston 16. This makes the opening edge of the cavity 163 at the particular location closer to the periphery of the piston 16 than the opening edge at the diametrically opposed location is. As a result, as shown in FIG. 4(*a*), the opening edge of the cavity 163 is not symmetric with respect to the injection axis of the fuel injection valve 6, and the cavity 163 is configured such that a portion of its opening edge in the intake other-side region bulges toward the periphery of the piston 16.

Increasing the distance between the sidewall 1631 of the cavity 163 and the injection tip of the fuel injection valve 6 in the intake other-side region as described above decreases the likelihood of the air-fuel mixture layer's contacting with the wall surface of the cavity 163 and reduces the cooling loss even if the air-fuel mixture layer spreads toward the other end of the engine's output shaft on the intake side. Note that the difference in the distance from the injection axis to the sidewall 1631 of the cavity 163 between the particular and diametrically opposed locations may be adjusted appropriately.

In this embodiment, in the exemplary configuration shown in FIG. 4, a portion of the sidewall of the cavity 163 in the entire intake other-side region is located closer to the periphery of the piston 16 as is clear from FIG. 4(*a*). Unlike this configuration, the portion of the sidewall of the cavity 163 in the intake other-side region may be partially located closer to the periphery of the piston 16, although not shown. This configuration minimizes the volume of the cavity 163, and helps maintain a high geometric compression ratio effectively. Moreover, as in the intake other-side region, the sidewall 1631 of the cavity 163 may also be located closer to the periphery of the piston 16 in a portion or portions of the intake one-side region and/or the exhaust other-side region (immediately) adjacent to the intake other-side region. That is to say, the area where the shape of the wall surface of the cavity 163 is changed may be expanded to include not only the intake other-side region but also the portion(s) of the intake one-side region and/or exhaust other-side region as well.

Alternatively, although not shown, the angle of the sidewall 1631 of the cavity 163 at the particular location may be set to be equal to that of the sidewall 1631 of the cavity 163 at the diametrically opposed location, and the sidewall 1631 of the cavity 163 at the particular location may be located closer to the periphery of the piston 16. In this configuration, the boundary between the sidewall 1631 and the bottom wall 1632 and the opening edge at the particular location are both located closer to the periphery of the piston.

Moreover, although not shown, the sidewall 1631 at the particular location may be designed to rise more steeply, for example, without changing the location of the opening edge of the cavity 163 (i.e., to form a larger angle relative to the horizontal plane) such that the sidewall 1631 at the particular location is located closer to the periphery of the piston 16. In this configuration, the boundary between the sidewall 1631 and the bottom wall 1632 at the particular location is located closer to the periphery of the piston.

Figure 5:
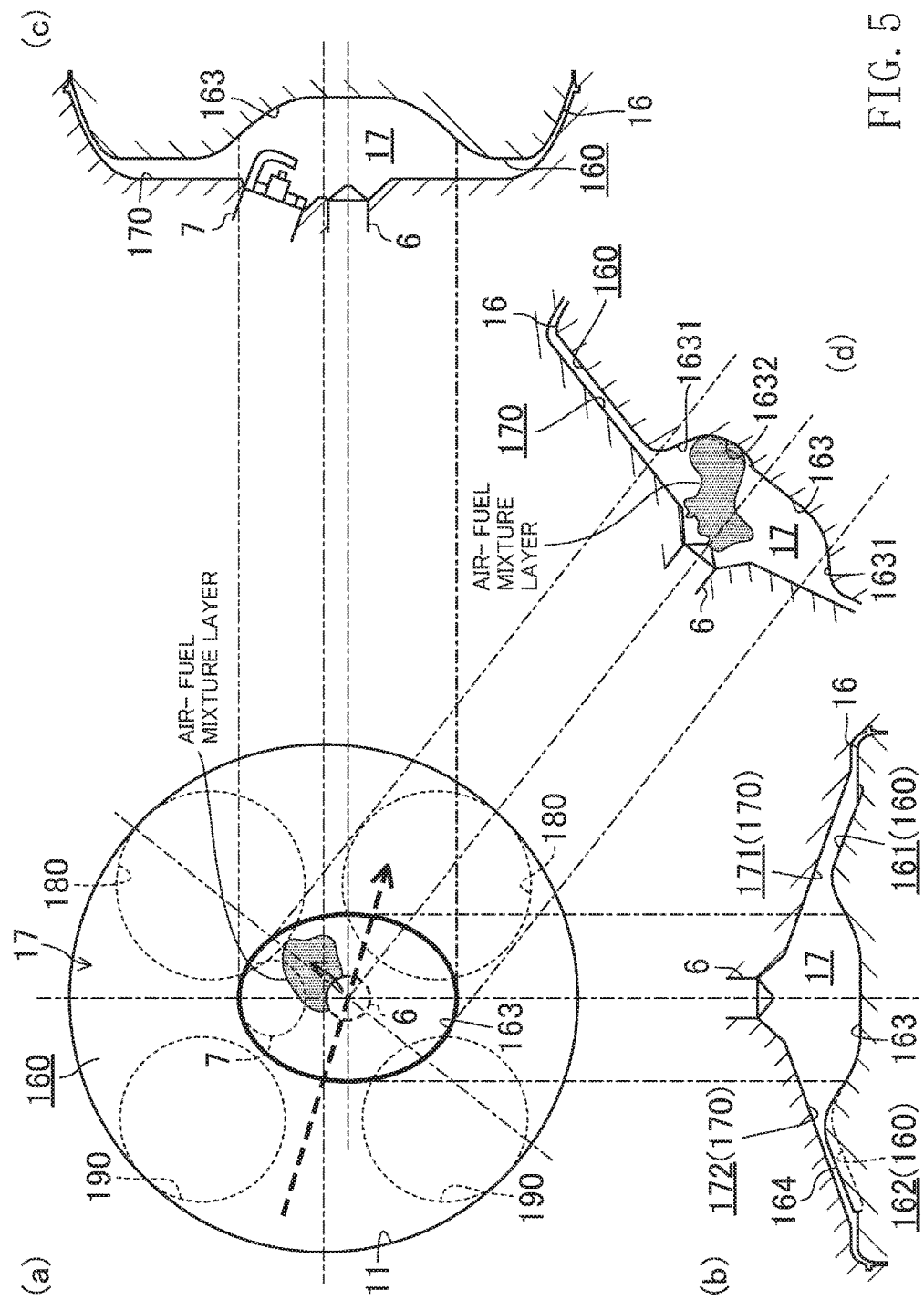
FIGS. 5(a)-5(d) illustrate a configuration for a cavity formed on a top surface of a piston, which is different from the configuration shown in FIGS. 4(a)-4(d).

FIG. 5 illustrates a different exemplary configuration from the one illustrated in FIG. 4. In the exemplary configuration shown in FIG. 5, the location of a bottom wall 1632 of a cavity 163 is changed. Specifically, the bottom wall 1632 of the cavity 163 at a particular location in an intake other-side region is indicated by a portion of the solid line on the upper right side of the paper on which FIG. 5(*d*) is drawn. The broken line corresponds to a mirror image of the bottom wall 1632 of the cavity 163 at a diametrically opposed location shown on the lower left side of the paper on which FIG. 5(*d*) is drawn. The bottom wall 1632 of the cavity 163 at the particular location is designed to be deeper than that at the diametrically opposed location. Thus, in the vertical cross section taken along the plane passing through the particular location in the intake other-side region and the location of the fuel injection valve 6 (see FIG. 5(*d*)), the distance from the injection tip of the fuel injection valve 6 to the wall surface of the cavity 163 at the particular location is longer than that from the injection tip to the wall surface of the cavity 163 at the diametrically opposed location. As a result, although the air-fuel mixture layer formed in the cavity 163 tends to spread toward the other end of the engine's output shaft on the intake side, the air-fuel mixture layer is less likely to be in contact with the bottom wall 1632 of the cavity 163. This cuts down the cooling loss.

In this configuration, unlike the exemplary configuration shown in FIG. 4, the location of the opening edge of the cavity 163 is not changed even in the intake other-side region. Thus, as shown in FIG. 5(*a*), the shape of the opening edge of the cavity 163 is symmetric with respect to the injection axis of the fuel injection valve 6.

Note that the difference in the depth of the bottom wall 1632 of the cavity 163 between the particular and diametrically opposed locations may be adjusted appropriately.

The bottom wall 1632 of the cavity 163 may be relatively deep in the entire intake other-side region. However, the bottom wall of the cavity 163 may be relatively deep in only a portion of the intake other-side region. Moreover, as in the intake other-side region, the bottom wall 1632 of the cavity 163 may be relatively deep in a portion or portions of the intake one-side region and/or the exhaust other-side region (immediately) adjacent to the intake other-side region. Specifically, the area where the shape of the wall surface of the cavity 163 is changed may be expanded to include not only the intake other-side region but also the portion(s) of the intake one-side region and/or exhaust other-side region.

Figure 6:
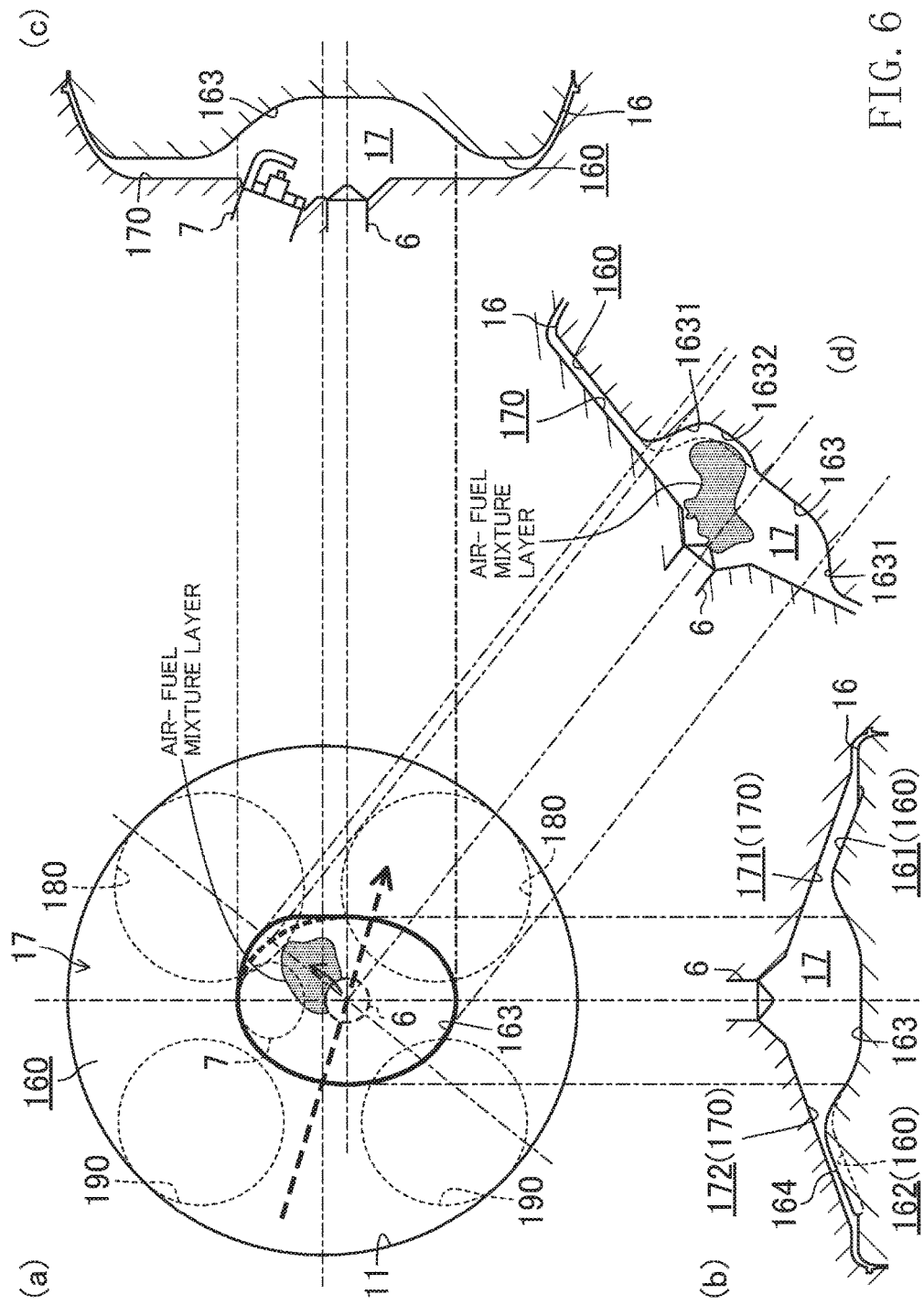
FIGS. 6(a)-6(d) illustrate a configuration for a cavity formed on a top surface of a piston, which is different from the configurations shown in FIGS. 4(a)-5(d).

FIG. 6 illustrates a combination of the exemplary configuration in which the sidewall 1631 of the cavity 163 is located closer to the periphery of the piston and the exemplary configuration in which the bottom wall 1632 of the cavity 163 is deepened. That is to say, in the exemplary configuration shown in FIG. 6, the locations of a sidewall 1631 and a bottom wall 1632 of a cavity 163 at a particular location in an intake other-side region are respectively different from those at a diametrically opposed location in an exhaust one-side region. Specifically, the sidewall 1631 and bottom wall 1632 of the cavity 163 at the particular location in the intake other-side region are indicated by the solid line on the upper right side of the paper on which FIG. 6(*d*) is drawn. The broken line corresponds to a mirror image of the sidewall 1631 and bottom wall 1632 of the cavity 163 shown on the lower left side of the paper on which FIG. 6(*d*) is drawn. The sidewall 1631 of the cavity 163 at the particular location is located closer to the periphery of a piston 16, and the bottom wall 1632 of the cavity 163 at the particular location is designed to be deeper than the bottom wall 1632 at the diametrically opposed location. Thus, in the vertical cross section taken along the plane passing through the particular location in the intake other-side region and the location of the fuel injection valve 6 (see FIG. 6(*d*)), the distance from the injection tip of the fuel injection valve 6 to the wall surface of the cavity 163 at the particular location is longer than that from the injection tip to the wall surface of the cavity 163 at the diametrically opposed location. As a result, although the air-fuel mixture layer formed in the cavity 163 tends to spread toward the other end of the engine's output shaft on the intake side, the air-fuel mixture layer is less likely to be in contact with the bottom wall 1632 of the cavity 163. This cuts down the cooling loss.

Note that in the exemplary configuration shown in FIG. 6, the opening edge of the cavity 163 bulges toward the periphery of the piston 16 in the intake other-side region as in the exemplary configuration shown in FIG. 4.

In each of the exemplary configurations shown in FIGS. 4(a)-6(d), the shape of the wall surface of the cavity 163 only in the intake other-side region is different from that in any of the other regions. Unlike these exemplary configurations, in the exemplary configuration shown in FIG. 7, the shape of the wall surface of the cavity 163 in the exhaust other-side region and the intake other-side region is different from that in the intake one-side region and the exhaust one-side region.

Figure 7:
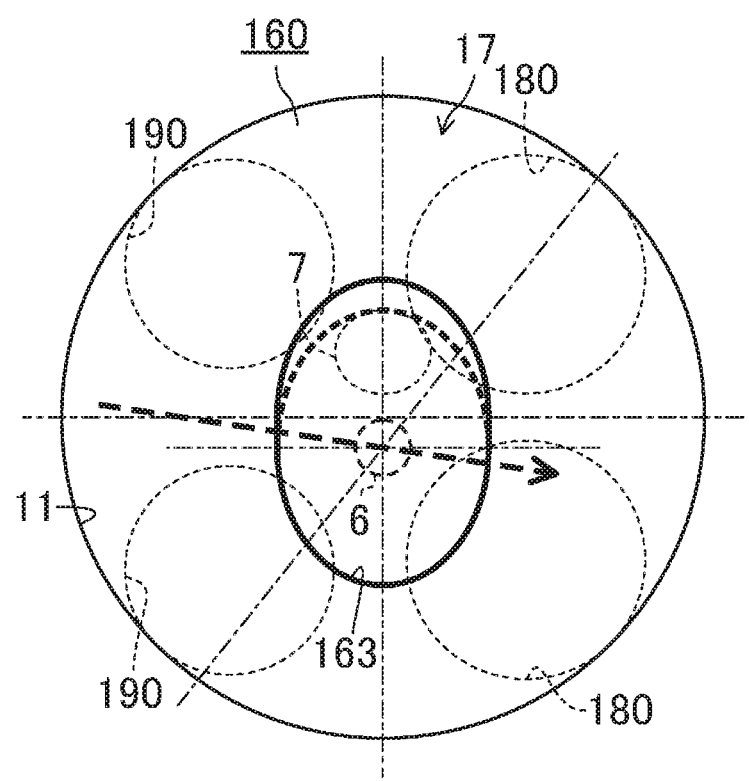
FIG. 7 is a plan view illustrating a configuration for a cavity formed on a top surface of a piston, which is different from any of the configurations shown in FIGS. 4(a)-6(d).

Specifically, the cavity shown in FIG. 7 has a substantially oval shape that is symmetric with respect to a ridge line of a pent roof on which the fuel injection valve 6 is arranged. Meanwhile, the substantially oval cavity 163 is formed such that a comparison made between the distance from the fuel injection valve 6 to the edge of the cavity located closer to one end of the engine's output shaft and the distance from the fuel injection valve to the edge of the cavity located closer to the other end of the engine's output shaft reveals that the distance to the edge located closer to the other end is longer than the distance located closer to the one end. In other words, the substantially oval cavity is shaped such that its widest portion (i.e., its portion including the location of the fuel injection valve 6) is expanded toward the other end of the engine's output shaft. However, the midpoint between the two edges of the cavity 163 respectively located closer to the one and the other ends of the engine's output shaft is also shifted, with respect to the bore center of the cylinder 11, toward the one end of the engine's output shaft.

In this cavity configuration, the sidewall 1631 of the cavity 163 in the intake other-side region is located closer to the periphery of the piston 16 than the shape indicated by the broken line in FIG. 7 (corresponding to a mirror image of the opening edge of the cavity on the intake one-side region and the exhaust one-side region) is. This reduces the likelihood of the air-fuel mixture layer's contacting with the sidewall 1631 of the cavity 163 as described above even if the air-fuel mixture layer spreads from the fuel injection valve 6 toward the intake other-side region.

In the exemplary configuration shown in FIG. 7, the sidewall 1631 of the cavity 163 in the exhaust other-side region is also located closer to the periphery of the piston 16 than the mirror image indicated by the broken line is. This is equivalent to a situation where a portion of the exhaust-side inclined surface 162 of the top surface 160 of the piston 16 hollowed out to form the cavity 163 expands toward the other end of the engine's output shaft. That is to say, the hollowed-out portion is not localized toward the one end of the engine's output shaft. This reduces deflection of a tumble flow in the exemplary configuration shown in FIG. 7 as indicated by the broken arrow in FIG. 7. This substantially prevents the air-fuel mixture layer from spreading from the fuel injection valve 6 toward the intake other-side region. Thus, the exemplary configuration shown in FIG. 7 also effectively reduces the likelihood of the air-fuel mixture layer formed in the cavity 163 contacting with the wall surface of the cavity 163.

In each of the exemplary configurations shown in FIG. 4(a)-6(d), the shape of a portion of the wall surface of the cavity 163 in the exhaust other side region may be modified to correspond to a portion of the wall surface of the cavity 163 in the intake other-side region so that the wall surface of the cavity 163 is symmetric with respect to the ridge line of the pent roof.

DESCRIPTION OF REFERENCE CHARACTERS

1 Engine
11 Cylinder
13 Cylinder Head
15 Crankshaft (Engine Output Shaft)
16 Piston
163 Cavity
1631 Sidewall
1632 Bottom Wall
17 Combustion Chamber
170 Ceiling Portion
18 Intake Port
19 Exhaust Port
6 Fuel Injection Valve

The invention claimed is:

1. A structure of a combustion chamber for a direct-injection engine, the structure comprising:
a piston inserted into a cylinder and having a cavity formed by recessing a top surface of the piston;
a surface of a cylinder head forming a ceiling portion of the combustion chamber and having an intake-side inclined surface and an exhaust-side inclined surface, the ceiling portion being configured to define, along with the cylinder and the piston, a pent-roof-shaped combustion chamber, the intake-side inclined surface being provided with openings of two intake ports arranged side by side along an engine's output shaft, the exhaust-side inclined surface being provided with an opening of an exhaust port; and
a fuel injection valve arranged on a ridge line of a pent roof at which the intake-side and exhaust-side inclined surfaces intersect with each other, the pent roof forming the ceiling portion of the cylinder head, the fuel injection valve being shifted, with respect to a bore center of the cylinder, toward one end of the engine's output shaft, the fuel injection valve having an injection axis that extends along an axis of the cylinder, the fuel injection valve being configured to inject fuel through an injection tip thereof into the cavity facing the injection tip, wherein
the top surface of the piston has inclined surfaces on an intake side and an exhaust side, and is raised by the inclined surfaces to correspond to the intake-side and exhaust-side inclined surfaces of the ceiling portion,
the cavity is shifted toward the one end of the engine's output shaft to face the injection axis of the fuel injection valve, the cavity being formed by hollowing out portions of the inclined surfaces, and
in a vertical cross section taken along a plane passing through a particular location in an intake other-side region and a location of the fuel injection valve, a distance from the injection tip of the fuel injection valve to a wall surface of the cavity at the particular location is longer than a distance from the injection tip to the wall surface of the cavity at a diametrically opposed location from the particular location with respect to the fuel injection valve, where the interior of the combustion chamber is divided, around the location of the fuel injection valve, into the four regions of:
(1) an intake one-side region located on the intake side with respect to the ridge line of the pent roof and closer to the one end of the engine's output shaft;
(2) an intake other-side region located on the intake side and closer to the other end of the engine's output shaft;
(3) an exhaust one-side region located on the exhaust side with respect to the ridge line of the pent roof and closer to the one end of the engine's output shaft; and
(4) an exhaust other-side region located on the exhaust side and closer to the other end of the engine's output shaft.

2. The structure of claim 1, wherein
the cavity at the particular location is shaped such that a sidewall of the cavity at the particular location is located closer to a periphery of the piston than the sidewall of the cavity at the diametrically opposed location is.

3. The structure of claim 2, wherein
an opening edge of the cavity at the particular location is located closer to the periphery of the piston than the opening edge of the cavity at the diametrically opposed location is.

4. The structure of claim 1, wherein
the cavity at the particular location is shaped such that a bottom wall of the cavity at the particular location is deeper than the bottom wall of the cavity at the diametrically opposed location.

5. The structure of claim 3, wherein
the cavity is symmetric with respect to the ridge line of the pent roof, and has an oval shape elongated along the engine's output shaft, and
a distance from the fuel injection valve to an edge of the cavity closer to the other end of the engine's output shaft is longer than a distance from the fuel injection valve to the edge of the cavity closer to the one end of the engine's output shaft.

6. The structure of claim 2, wherein
the cavity at the particular location is shaped such that a bottom wall of the cavity at the particular location is deeper than the bottom wall of the cavity at the diametrically opposed location.

7. The structure of claim 3, wherein
the cavity at the particular location is shaped such that a bottom wall of the cavity at the particular location is deeper than the bottom wall of the cavity at the diametrically opposed location.

* * * * *